H. WATERS.
Machine for Rolling Metals.
No. 45,886.
Patented Jan'y 10, 1865.
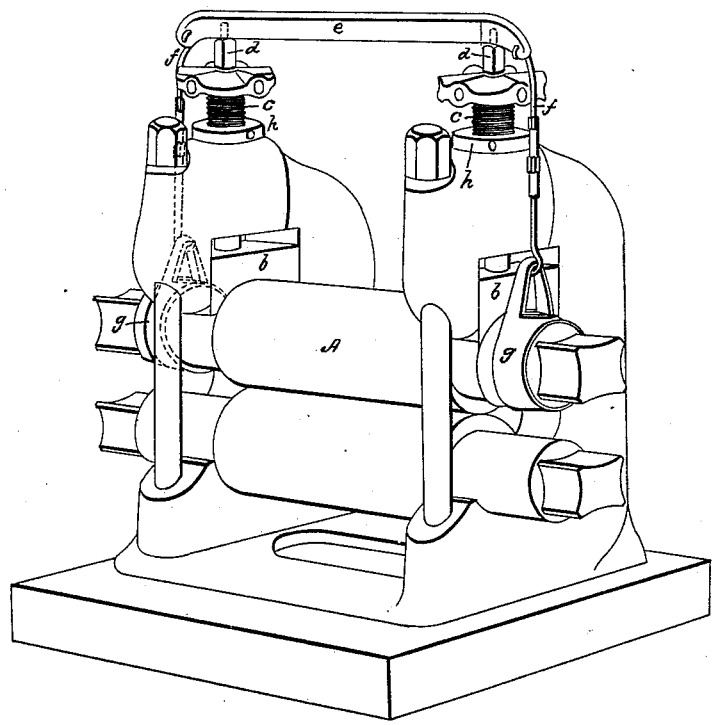

UNITED STATES PATENT OFFICE.

HERVEY WATERS, OF NORTHBRIDGE, MASSACHUSETTS.

MACHINE FOR ROLLING METALS.

Specification forming part of Letters Patent No. 45,886, dated January 10, 1865.

*To all whom it may concern:*

Be it known that I, HERVEY WATERS, of Northbridge, in the county of Worcester and State of Massachusetts, have invented an Improvement in Rolling-Mills; and I do hereby declare that the following, taken in connection with the drawings which accompany and form part of this specification, is a description of my invention sufficient to enable those skilled in the art to practice it.

My invention relates to the hanging of the upper one of a pair or set of rolls in a mill for rolling metals, the objects being to be the better able at all times to make adjustments of the same with facility, to be the better able to see the condition of the journals of the rolls in regard to lubrication, and the more easily to keep them in good condition in that regard; also to be able to take out and put in the rolls with greater facility, and the better to make and maintain such an adjustment as will prevent slamming when the work is introduced between the rolls.

My invention consists in a new manner of arranging a yoke upon the adjusting-screws of the mill, so as to require but one yoke for both ends of the rolls instead of two, and but two suspending-bolts instead of four, and also enabling the suspension-bearings of the roll to be at any convenient points in the length of the roller-necks not immediately below the adjusting-screws, whereby any holes through the stands for the suspension-rods become unnecessary.

The drawing shows a perspective view of a rolling-mill embodying my invention.

A is the top roll of the mill; $b\,b$, adjustable boxes for the same, and $c\,c$ the adjusting-screws. $d\,d$ are bolts extending through axial holes in the adjusting-screws, and having collars (integral with the bodies of the bolts) resting on the top ends of the adjusting-screws. The lower ends of the bolts screw into and hold the boxes up against the ends of the adjusting-screws snugly, but not too tightly so as to prevent turning the screws, and the holes through the screws are large enough to allow a sidewise movement in the lateral adjustment of the boxes. Integral with but above the collars of the bolts are heads suitable for being turned by a wrench or lever, and still above, and still integral with the same, extend pivots, upon which is fitted the yoke $e$, resting there easily, so as not to bind in consequence of any slight changes due to the necessary adjustments. To each end of the yoke are jointed the suspending-rods $f\,f$, made adjustable in length by means of a long box with right and left hand screws or in any other convenient manner. These rods are jointed to and support the bail boxes or bands $g\,g$ upon the necks of the rolls, and are so adjusted as to keep the roll sufficiently snug to the journal-boxes. This arrangement, as may be readily seen, allows of the adjustment of the roll without materially disturbing the relation of the parts supporting it, and will do so even if the bolts $d\,d$ through the adjusting-screws are dispensed with and the yoke be so hung as to rest directly on the adjusting-screws; but I prefer to have the bolts, because they relieve the upper roller-journals when there is no work between the rolls. I also greatly prefer to have check-nuts, as at $h\,h$, on the adjusting screws, to make and keep all taut, when not otherwise required, to allow of adjustments.

What I claim is—

The arrangement of a single yoke, with its appurtenances and connections, substantially as and for the purposes specified.

In witness whereof I have hereunto set my hand this 29th day of November, A. D. 1864.

HERVEY WATERS.

Witnesses:
 J. B. CROSBY,
 FRANCIS GOULD.